United States Patent
Reich

(10) Patent No.: US 7,640,159 B2
(45) Date of Patent: Dec. 29, 2009

(54) SYSTEM AND METHOD OF SPEECH RECOGNITION FOR NON-NATIVE SPEAKERS OF A LANGUAGE

(75) Inventor: David E. Reich, Jupiter, FL (US)

(73) Assignee: Nuance Communications, Inc., Burlington, MA (US)

( * ) Notice: Subject to any disclaimer, the term of this patent is extended or adjusted under 35 U.S.C. 154(b) by 672 days.

(21) Appl. No.: 10/896,426

(22) Filed: Jul. 22, 2004

(65) Prior Publication Data

US 2006/0020462 A1    Jan. 26, 2006

(51) Int. Cl.
G10L 15/02 (2006.01)
G10L 15/04 (2006.01)
G10L 15/28 (2006.01)
G06F 17/20 (2006.01)
G06F 17/27 (2006.01)
G10L 17/00 (2006.01)
H04M 1/64 (2006.01)

(52) U.S. Cl. .................. 704/254; 704/8; 704/9; 704/250; 704/255; 379/88.05; 379/88.02; 379/88.06

(58) Field of Classification Search .......... 704/1–10, 704/231–259, E15.001–E15.05; 379/88.01–88.15, 379/201.01, 201.06, 907
See application file for complete search history.

(56) References Cited

U.S. PATENT DOCUMENTS

| | | | |
|---|---|---|---|
| 5,799,269 A | | 8/1998 | Schabes et al. |
| 5,839,106 A | * | 11/1998 | Bellegarda .................. 704/257 |
| 6,029,132 A | * | 2/2000 | Kuhn et al. ................. 704/260 |
| 6,061,646 A | | 5/2000 | Martino et al. |
| 6,085,160 A | * | 7/2000 | D'hoore et al. .......... 704/256.2 |
| 6,249,763 B1 | | 6/2001 | Minematsu |
| 6,275,789 B1 | | 8/2001 | Moser et al. |
| 6,385,586 B1 | * | 5/2002 | Dietz .......................... 704/277 |
| 6,438,524 B1 | | 8/2002 | Shi |
| 6,618,702 B1 | * | 9/2003 | Kohler et al. ............... 704/250 |
| 6,912,499 B1 | * | 6/2005 | Sabourin et al. ............ 704/243 |
| 7,031,908 B1 | * | 4/2006 | Huang et al. ................... 704/9 |
| 2001/0023397 A1 | * | 9/2001 | Tajima et al. ............... 704/231 |

(Continued)

OTHER PUBLICATIONS

Byrne, W., et al., "Is Automatic Speech Recognition Ready for Non-Native Speech?. . .", ESCA Conf. on Speech Tech. in Language Learning, (1998).

(Continued)

Primary Examiner—David R Hudspeth
Assistant Examiner—David Kovacek
(74) Attorney, Agent, or Firm—Wolf, Greenfield & Sacks, P.C.

(57) ABSTRACT

An accent compensative speech recognition system and related methods for use with a signal processor generating one or more feature vectors based upon a voice-induced electrical signal are provided. The system includes a first-language acoustic module that determines a first-language phoneme sequence based upon one or more feature vectors, and a second-language lexicon module that determines a second-language speech segment based upon the first-language phoneme sequence. A method aspect includes the steps of generating a first-language phoneme sequence from at least one feature vector based upon a first-language phoneme model, and determining a second-language speech segment from the first-language phoneme sequence based upon a second-language lexicon model.

18 Claims, 3 Drawing Sheets

U.S. PATENT DOCUMENTS

| | | | |
|---|---|---|---|
| 2002/0055844 A1* | 5/2002 | L'Esperance et al. | 704/260 |
| 2002/0087314 A1* | 7/2002 | Fischer et al. | 704/255 |
| 2002/0111805 A1 | 8/2002 | Goronzy et al. | |
| 2002/0156627 A1* | 10/2002 | Itoh et al. | 704/254 |
| 2002/0160341 A1* | 10/2002 | Yamada et al. | 434/157 |
| 2003/0011642 A1 | 1/2003 | Sheng | |
| 2003/0191643 A1* | 10/2003 | Belenger et al. | 704/254 |
| 2004/0078191 A1* | 4/2004 | Tian et al. | 704/9 |
| 2004/0088163 A1* | 5/2004 | Schalkwyk | 704/251 |
| 2004/0176078 A1* | 9/2004 | Melnar et al. | 455/414.1 |
| 2004/0193417 A1* | 9/2004 | Menendez-Pidal et al. | 704/255 |
| 2004/0210438 A1* | 10/2004 | Gillick et al. | 704/254 |
| 2005/0180547 A1* | 8/2005 | Pascovici | 379/88.01 |
| 2005/0197835 A1* | 9/2005 | Reinhard et al. | 704/249 |

OTHER PUBLICATIONS

Mayfield, L., et al., "Adaptation Methods for Non-Native Speech", Proceedings of Multilinguality in Spoken Language Processing, Aalborg, (Sep. 2001).

Livescu, K., et al., "Lexical Modeling of Non-Native Speech for Automatic Speech Recognition", In Proc. ICASSP, 2000.

* cited by examiner

SYSTEM AND METHOD OF SPEECH RECOGNITION FOR NON-NATIVE SPEAKERS OF A LANGUAGE

FIELD OF THE INVENTION

The present invention relates to the fields of electronic communications and data processing, and, more particularly, to speech recognition systems for use in electronic communication and data processing.

BACKGROUND OF THE INVENTION

Human speech is increasingly used as the input form for data, instructions, commands, and other information inputted into communication and data processing systems. Speech input can be used, for example, to conduct and record transactions electronically, to request and relay information electronically, and, to provide command and control for various types of electronic communication and/or data processing systems. The use of human speech as the input provides considerable mobility and flexibility in the use of all types of electronic communication and data processing systems, especially system where the use of peripheral devices such as a keyboard is awkward or inconvenient.

Direct input of speech into electronic systems requires that human speech signals be converted into a machine readable form. Such conversion can be done with conventional speech recognition systems that typically convert voice-induced signals into a sequence of phonetically-based recognition features using spectral analysis of speech segments or a sequence of feature vectors based on linear prediction characteristics of the speech. Such features reflect the various characteristics of the human voice such as pitch, volume, length, tremor, etc.

These speech-derived features provide an acoustic signal of the word to be recognized. The acoustic signal can be compared against an acoustic description or model of phonemes stored electronically in a database to obtain a statistically significant match. For example, each phoneme in the database whose pitch closely matches that of the particular segment of the inputted utterance can be found. Then, to narrow the search for a match, the tremor of each phoneme can be compared to the segment of the inputted utterance. The process can continue until a match having a desired confidence level is obtained.

In many speech recognition systems, for example, the acoustic signal is converted by an A/D converter into a digital representation of the successive amplitudes of the audio signal created by the underlying speech and then converted into a frequency domain signal consisting of a sequence of frames, each of which provides the amplitude of the speech signal in each of a plurality of frequency bands. The sequence of frames produced by the speech to be recognized is compared with a sequence of nodes, or frame models, corresponding to the acoustic model.

Accordingly, a sequence of phonemes based on the underlying speech input is obtained. This sequence is then compared to phoneme groupings corresponding to speech segment comprising one or more sentences, a phrase, or an individual word.

A language model can also be used to reduce the computational demands and increase the likelihood of a correct match. The particular language model typically predicts the relative likelihood of the occurrence of each word in the speech recognition system vocabulary given other words that have been identified in connection with the specific speech utterance. These predictions are based on the fact that the likelihood of a given word having been spoken is a function of its context as expressed by the other words in a sentence or segment of speech. The likelihoods can be determined, for example, by analyzing a large body of text and determining from that text the number of times that each word in the vocabulary is preceded by each other word in the vocabulary. Diagram language models, for example, give the likelihood of the occurrence of a word based on the word immediately preceding. Trigram language models, similarly, base likelihood on the occurrence of the two immediately preceding words.

When the speech recognition system cannot identify a match, the speaker can be requested by the system to choose the correct word from a list of candidate words. If the speech recognition system makes an incorrect match, the speaker can be provided an opportunity to correct the choice. Such selection and/or changes can be fed back into the speech recognition system and stored in a reference table to improve the accuracy of the system.

In conventional speech recognition systems, the acoustic and language models used are typically specific to the language of the system. As already described, however, the recognition of a word depends on the translation of aural patterns into discrete, recognizable features representative of physical phenomena such as pitch, volume, and tremor. Accordingly, the accuracy of the speech recognition system depends critically on how well the speaker articulates the words he or she speaks. This, in turn, depends significantly on whether and to what extent the speaker speaks with an accent. It is this factor that frequently makes distinguishing and accurately recognizing the speech of non-native speakers of the language of the system highly problematic.

Proposed solutions to this problem include installing speech recognition engines for different languages and requesting that the user specify which language he or she would like to use. This solution is not viable, however, in every instance in which a non-native speaker is using a speech recognition system. For example, the system user may wish to use a particular language despite being accented in another language. Even more problematic are those situations in which the user interface of the speech recognition system is only available in a particular language and the user has no recourse but to use that language. For example, because of the user's accent, the recognition accuracy may be so low as to render the user interface inoperable for a heavily accented user.

Another proposed solution is to independently create an entirely new system incorporating pronunciation variants to attempt to improve the accuracy of the speech recognition system. Such a solution, however, may have only a limited ameliorative effect on accuracy and, in any event, is certain to increase the costliness of providing such a speech recognition system. Moreover, a system using a vast number of accent combinations is likely to be infeasible owing to the considerable portion of a processor's memory that would likely need to be allocated in order to store the acoustic and language models associated with such a system.

SUMMARY OF THE INVENTION

The present invention reduces or eliminates adverse effects arising when a non-native speaker with a moderate or heavy accent desires, or is required, to use a voice recognition device in a language other than his or her native language. The invention achieves the reduction or elimination of such effects without the need for constructing new or different acoustic models incorporating accent compensating variations. Moreover, the invention avoids having to considerably alter a processor's memory allocation in order to achieve this ameliorative effect.

The invention provides an accent compensative speech recognition system for use with a signal processor that generates one or more feature vectors based upon a voice-induced electrical signal. The system can include a first-language acoustic module that determines a first-language phoneme sequence based upon the feature vector. The system can further include a second-language lexicon module that determines a second-language speech segment based upon the first-language phoneme sequence.

The invention further provides a method for use with a signal processor generating at least one feature vector based upon a voice-induced electrical signal. The method can include the step of generating a first-language phoneme sequence from at least one feature vector based upon a first-language phoneme model. The method can further include the step of determining a second-language speech segment from the first-language phoneme sequence based upon a second-language lexicon model.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF PREFERRED EMBODIMENTS

Figure 1:
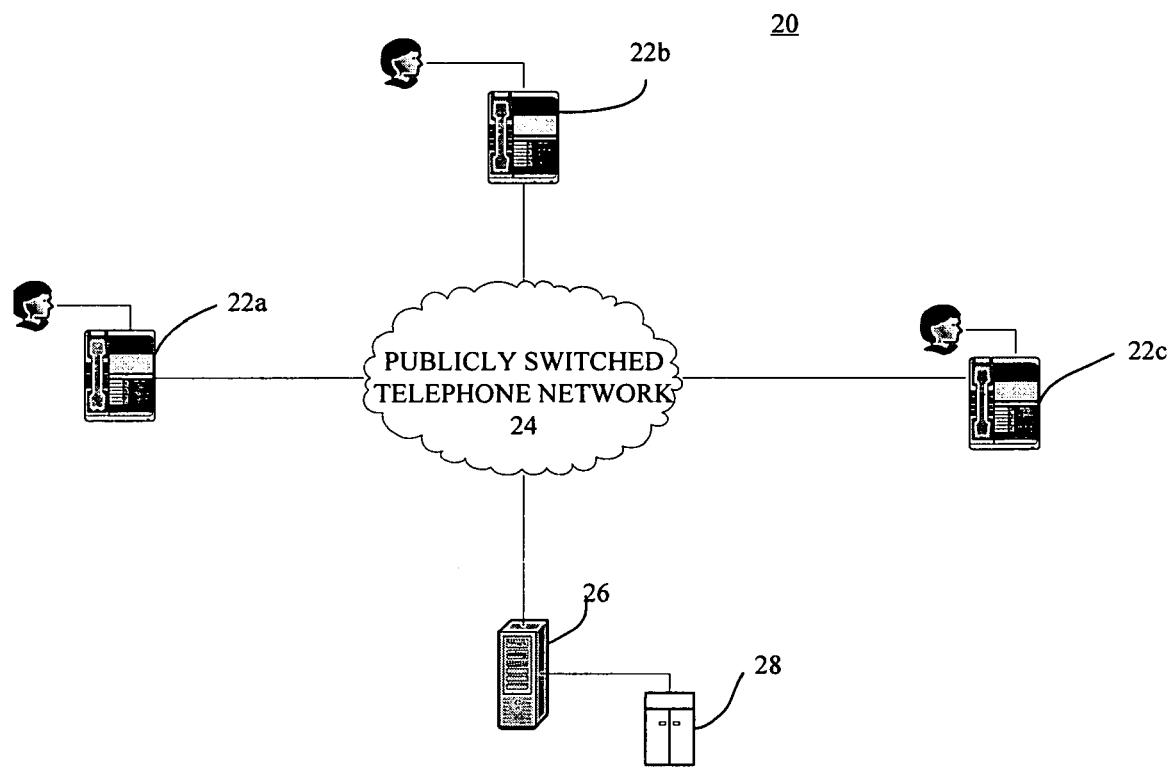
FIG. 1 is a schematic diagram of a communication network in which a system according to one embodiment of the invention may advantageously be used.

FIG. 1 provides a schematic illustration of a communication network 20 in which can be used a system according to one embodiment of the present invention. Although the invention is discussed in the context of the communication network 20, it is to be understood that the communication network represents only one environment in which the system can be advantageously employed. Many other uses and applications of the system in different communication and data processing environments will be apparent from the description provided herein. Indeed, the system can be advantageously used with any telecommunication or data processing device in which data, instructions, or other information is inputted in the form of human speech.

As shown in FIG. 1, the communication network 20 illustratively includes a plurality of telephones 22a, 22b, 22c that each individually connect via a publicly switched telephone network 24 to a voice server 26. The voice server 26 can be used by a business or governmental agency to provide automated telephonic services to each of the callers.

Such automated telephonic services can be used by a business, for example, to undertake a variety of transactions in which the caller conveys and/or receives voice information over a telephony-based or other communication network. Examples of the transactions that can be conducted in this manner by businesses and consumers include personal and commercial financing transactions, over-the-phone loan processing, account processing, airline and automobile reservation setting, and a host of other routine and non-routine business and commercial transactions.

The voice server 26 can facilitate such transactions through the use of one or more software-based voice applications, for example. As will be readily understood by those of ordinary skill in the art, such applications can include applications programs written, for example, in an XML programming language such as VoiceXML. These applications enable the voice server 26 to operate as a fully automated, virtual call center for the business. One such software application is the Websphere® voice server platform made by International Business Machines Corporation of Armonk, N.Y.

Governmental entities similarly can use the voice server 26 on which is running a VoiceXML or other XML programming language for conducting governmental transactions over the telephone. Such transactions can include, for example, renewing a driver's license or registering for a social service. As the sophistication of XML applications increases, it will be possible for businesses and government agencies to conduct an ever greater number of routine or even non-routine commercial and governmental transactions by telephone.

In each of the various scenarios described, the caller is able to provide information directly to the voice server 26 by simply speaking into a telephone or other voice input device. Other voice inputs devices can include, for example, personal digital assistants (PDAs), voice-capable computers, as well as other devices capable of effecting circuit-based or packet-based communications, such as VoIP. It is highly desirable that a caller in each of the above scenarios be able communicate with the voice server 26 through the direct input of speech. This is so, for example, if the caller does not have access to a touch-tone telephone. It can be even more critical in other contexts, such as those involving callers who are visually impaired. It also avoids having to provide the caller with a keyboard interface or restricting communications to those carried out using a computer connected to a data communication network.

As further illustrated in FIG. 1, the voice input is obtained using a speech recognition device 28 that is connected to the voice server 26 and that is configured to process human speech conveyed via a telephone 22a, 22b, 22c to the voice server.

Figure 2:
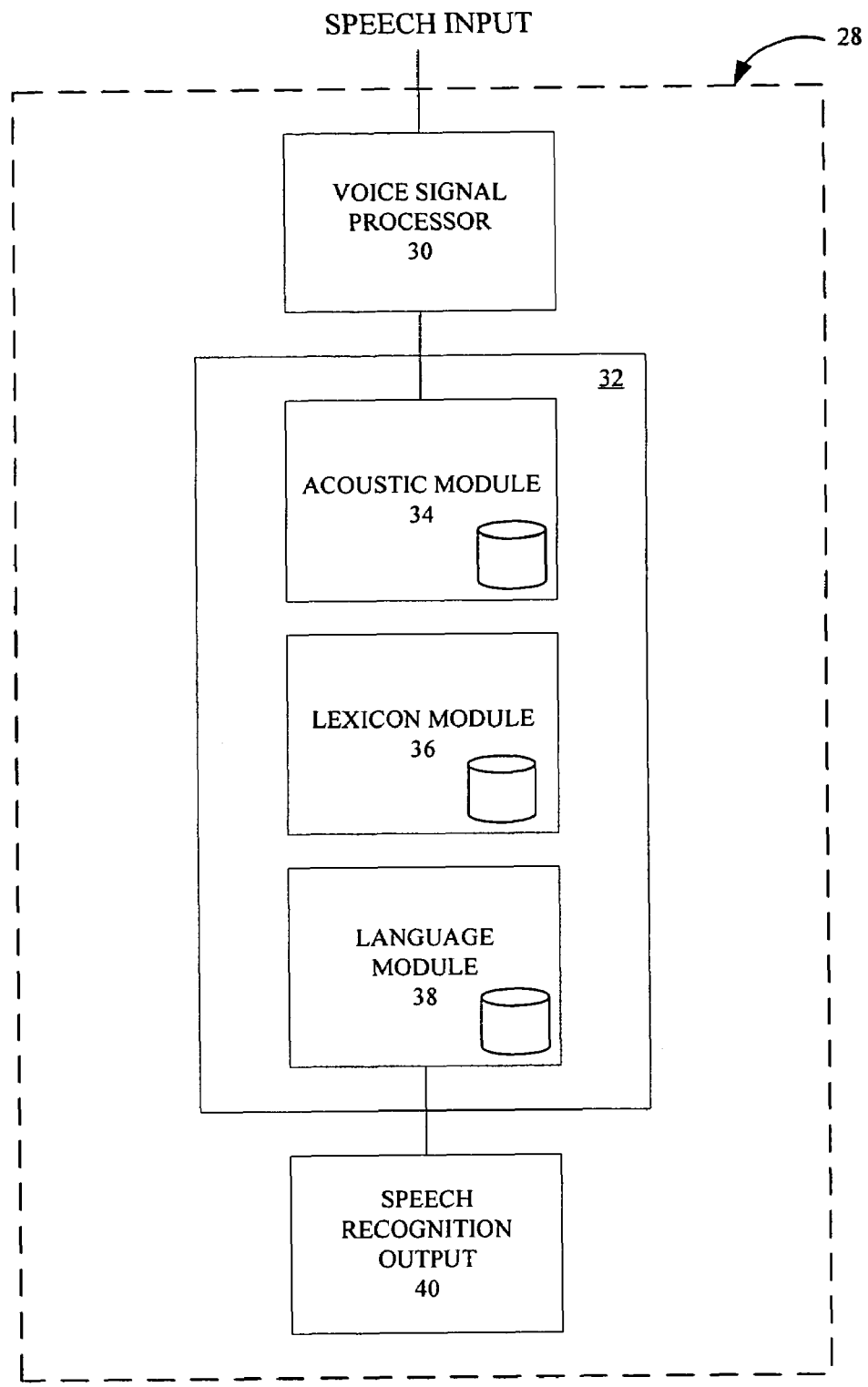
FIG. 2 is a schematic diagram of a voice recognition device with which a system according to one embodiment of the invention may advantageously be used.

As shown in FIG. 2, the speech recognition device 28 illustratively includes a voice signal processor 30 that generates at least one feature vector based upon a voice-induced electrical signal that results from speech input. A feature vector can be an n-tuple whose elements correspond to one or more physical phenomena that characterize a spoken word or speech segment, such as pitch, volume, and tremor. Typically, an acoustic signal generated by a human utterance is inputted into the voice signal processor 30 which by an analog-to-digital (A/D) conversion converts the acoustic signal into a digital representation of a set of measurements of the utterance, including its volume, frequency, and pitch, which can be represented by the feature vector. For example, the acoustic signal can be converted by an A/D converter into a digital representation of the successive amplitudes of the audio signal created by the underlying speech and then converted into a frequency domain signal consisting of a sequence of frames, each of which provides the amplitude of the speech signal in each of a plurality of frequency bands. Other features based on the acoustic signal can be similarly determined on a frame-by-frame basis.

The speech-derived feature vectors thus provide a quantifiable representation of an underlying acoustic signal. The elements of a feature vector can be compared by the speech recognition device 28 to corresponding acoustic descriptions of various phonemes of the underlying language of the speech segment or word that is to be recognized. A library of the acoustic descriptions of known phonemes of the language, defining the acoustic model of the language, can stored in a database of the recognition device 28. The speech segment or word, accordingly, is recognized by finding a match between the feature vector representation of the acoustic signal and a particular phoneme sequence. By correctly identifying each of the phonemes that comprise the sequence, a speech segment or word can be correctly recognized by the voice recognition device's 28 then matching the phoneme sequence which has been generated on the basis of the acoustic model to known words of the underlying language.

An inherent problem with conventional speech recognition devices is that the acoustic representation that is compared to the acoustic model may be skewed or biased as a result of the particular speaker's pronunciation or accent, thus severely and adversely affecting the accuracy of the speech recognition. This is especially so for a non-native speaker who speaks with a heavy or even moderate accent.

The illustrated embodiment of the invention mitigates against the problem by providing an accent compensative speech recognition system 32 that can be used with the signal processor 30 that generates one or more feature vectors based upon the voice-induced electrical signal. The system 32 illustratively includes a first-language acoustic module 34 that determines a first-language phoneme sequence based upon the one or more feature vectors generated by the signal processor 30. The first-language acoustic module 34 is based on an acoustic model of the language that is the native language of the speaker.

The system 32 further includes a second-language lexicon module 36. The second-language lexicon module 36 determines a second-language word or speech segment based upon the first-language phoneme sequence determined by the first-language acoustic module 34. The second-language word or speech segment determined through the recognition effected by the second-language lexicon module 36, however, is not that of the native language of the speaker, but rather that of a second, desired language. This is a particularly advantageous result, for example, if a non-native English speaker is calling a business or governmental automated telephone service and wishes to, or must, conduct his or her transaction in English.

The system 32 eliminates much if not all of the risk that a word or speech segment will be mischaracterized or be deemed unrecognizable owing to the accent of the speaker since the first-language acoustic module 34 uses an acoustic model based on the natural language of the speaker. The first-language acoustic module 34 is thus able to provide a correctly recognized phoneme sequence that the second-language lexicon module 36 is able to use to render the desired word or speech segment in the non-native language.

For example, the first-language acoustic module 34 can be based on a standard Spanish language acoustic model, with the second-language lexicon module 36 being based on and intended for recognition of words or speech in the English language. Accordingly, for a speaker with heavy or moderate Spanish accent who is likely to pronounce, for example, the vowel "e" much like a long "a" in English, the first-language acoustic module 34 generates a phoneme sequence that more closely approximates an "e" rather than an "a." With the phoneme sequence being thus correctly identified by the first-language acoustic module 34, the second-language lexicon module 36 is able to search for a match based on the correctly identified "e" rather than erroneously treat the underlying sound as corresponding to an English language "a." The first-language acoustic module 34 and second-language lexicon module 36 of the system 32 likewise handle sounds associated, for example, with the English language vowel "i," which a speaker with a Spanish accent is more likely to pronounce as an English language "e."

Although these examples discuss only certain aspects of correctly recognizing English words spoken in English by a speaker with a Spanish accent, it will be readily apparent that the first-language acoustic module 34 and the second-language lexicon module 36 of the system 32 can similarly handle other accent-based pronunciation deviations that are likely to occur with any non-native speaker of a language. The system 32 is able to accommodate any non-native speaker of any language by using the appropriate combination of an acoustic model in one language for the first-language acoustic module 34 and a lexicon model in a different language for the second-language lexicon module 36. The salient characteristic of the system 32 is that, for the non-native speaker of a particular language, the first-language acoustic module 34 is based on an acoustic model for the speaker's native language, and the second-language lexicon module 36 is based on a lexicon model for the language in which the non-native speaker desires to, or must, converse.

A significant advantage of the system 32 is that it obviates the need to construct a new or different acoustic model that incorporates pronunciation variants or other compensative variations for overcoming the difficulties posed by the non-native speaker's accent. Instead, the system 32 need only incorporate a standardized acoustic module based on the speaker's native language and combine it with the appropriate lexicon module for speech recognition in the desired language. This reduces the cost and complexity of effecting speech recognition for a host of non-native speakers whose speech is to be recognized in a variety of desired languages.

Related to this last aspect of the invention, in alternative embodiment of the system 32, the first-language acoustic module 34 comprises a plurality of distinct first-language acoustic modules, each of which determines a distinct language phoneme sequences based upon the at least one feature vector generated by the voice signal processor 30. For example, one distinct language can be Spanish, another can be Brazilian Portuguese, and a third can be Creole. Other world languages such as English or French as well as other regional and national languages alternately can be the basis for the first-language acoustic module 34. Each of the plurality of distinct language acoustic modules 34 determines a phonemic sequence based on one of these languages. According to this embodiment of the invention, the system 32 pairs one of the plurality of distinct first-language acoustic modules 34 with the second-language lexicon module 36. The second-language lexicon module 36, again, can be based in English or any other language.

Which of the plurality of distinct first-language acoustic modules 34 is paired with the second-language lexicon module 36 can be determined by a caller selection. For example, the system 32 can optionally include a selection module (not shown) that instructs the caller to select a particular language corresponding to the caller's native language.

In alternative embodiment, the selection regarding which of the plurality of distinct first-language acoustic modules 34 is to be paired with the second-language lexicon module could be based on a confidence score. The confidence score can be based on a probability assessment that the underlying phonemic sequence determined by the first-language acoustic module corresponds to the recognized word or speech segment determined by the second-language lexicon module 36. Various models for assessing the probability are known to those of ordinary skill in the art, including for example linear prediction coding, auto-regression methods, as well as other statistical techniques.

As illustrated in FIG. 2, the system 32 optionally includes a language module 38. The language model can reduce the computational requirements and increase the accuracy of the confidence score. The language module 38 can be based on any of a number of language models known to those of ordinary skill in the art, these language models being used to predict the relative likelihood of the occurrence of certain words in a given sequence taking into account the fact that the probability that a certain word or speech segment occurs is a function of the context in which the possible word or speech is spoken.

Accordingly, in another particular embodiment, the system 32 can optionally determine a confidence score for each of the plurality of words or speech segments determined by the cooperative interaction of various permutations of the plurality of first-language acoustic modules 34 with the second-language lexicon module 36. Thus, according to this embodiment, a minimum confidence score can be mandated. If the voice recognition results for a particular caller fail to yield the minimum confidence score, the system 32 can then prompt the caller to make a non-native language selection. The process, moreover, can be repeated, with the caller being asked to choose a different non-native language at each iteration of the process until a confidence score greater than or equal to the minimum is achieved, or until the availability of alternative first-language acoustic modules 34 is exhausted.

In still another embodiment, the confidence score can be used by the system 32 automatically without any direct input from the caller. According to this embodiment, the second-language lexicon module 36 determines a plurality of distinct speech segments, including the second-language speech segment, each distinct speech segment having a corresponding confidence score ascribed to it based on the relative likelihood that the recognized speech segment or word has been correctly ascertained. By iteratively pairing each of the plurality of first-language lexicon modules 34, or distinct language acoustic modules, with the second-language lexicon module 36, a confidence score for each such pairing is obtained. Based on these confidence scores, therefore, a best-possible confidence score can be obtained. The system 32 recognizes the speech segment or word by choosing the one having the highest confidence score. Accordingly, the second-language speech segment is that one of the plurality of distinct speech segments generated by the various permutations of first-language acoustic module 34 with the second language lexicon module 36 pairings, the second-language speech segment being the one whose confidence score is greater than that corresponding to each other of the plurality of speech segments.

According to still another embodiment of the invention, the second-language lexicon module 36 also comprises a plurality of second-language lexicon modules, each defining a distinct language lexicon module for a plurality of languages. The first-language acoustic module 34, according to this embodiment, again, comprises a plurality of acoustic modules for determining distinct language phoneme sequences based upon a voice-induced electrical signal. According to this embodiment, the system 32 pairs various ones of the plurality of distinct first-language acoustic modules 34 with various ones of the plurality of distinct second-language lexicon modules 36. Thus, as will be readily appreciated, if there are n first-language acoustic modules and m second-language lexicon modules, the total number of possible pairings is n×m. The system 32 can select a particular pairing based upon a confidence score.

The system 32 can determine a confidence score, as described above, for each of the plurality of speech segments or words determined by the various pairings of the plurality of distinct first-language modules 34 with the plurality of distinct second-language models 36. The second-language speech segment, defining the recognized speech segment or word determined by the system 32 according to this embodiment, is therefore that one of the plurality of speech segments or words whose confidence score is greater than the confidence score associated with each other of the speech segments or words determined by the various pairings of the plurality of distinct first-language modules 34 with the plurality of distinct second-language models 36.

The system 32 is illustrated here as residing on or incorporated into the voice recognition device 28 associated with the voice server 26. As will be readily understood by those of ordinary skill in the art, the first-language acoustic module 34 and the second-language lexicon module 36 can, for example, be software modules configured to run on either the voice server 28 or the voice recognition device 26 connected thereto. Alternately, the system 32 can be dedicated circuitry including logic gates and memory for implementing the functions of both the first-language acoustic module 34 and the second-language lexicon module 36, the circuitry being incorporated into the voice server 28 or the voice recognition device 26. Alternately, the circuitry can be external to, but connected with, one or both of the voice server 28 and/or the voice recognition device 26.

Figure 3:
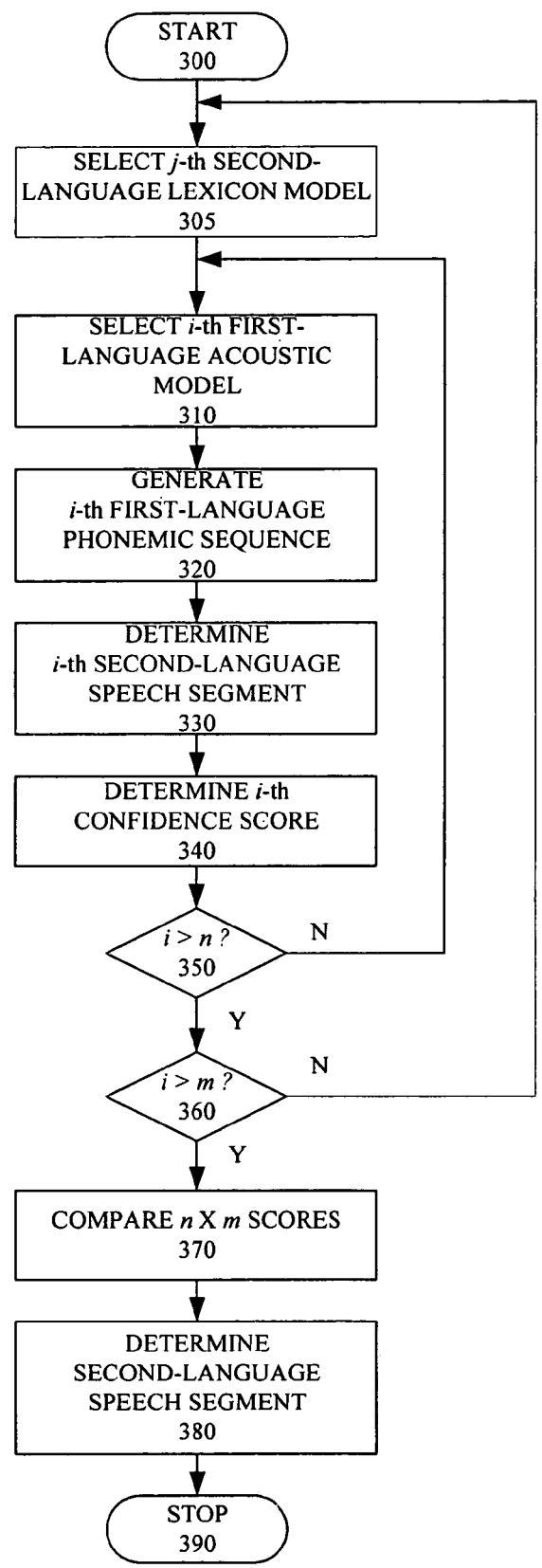
FIG. 3 provides a flowchart of a method of enhancing voice recognition for a non-native speaker according to one embodiment of the invention.

FIG. 3 provides a flowchart 300 that illustrates some of the method aspects of the invention. The method illustratively includes in step 305 selecting a distinct second-language lexicon model, the model serves to recognize or identify words or speech segments in a selected language based on particular phoneme sequences. The particular phoneme sequences, in turn, are generated using a first-language acoustic model that is based on the natural language of a non-native speaker, the non-native speaker's natural language being different from that selected for the second-language lexicon model. In step 310 of the illustrated method, a first-language acoustic model is selected. In step 320, a first-language phoneme sequence is generated from a voice signal processor-generated vector feature, the phoneme sequence being based upon the first-language acoustic model. A second-language speech segment is determined in step 330 from the first-language phoneme sequence and based on the second-language lexicon model.

Illustratively, the method further includes the optional step 340 of determining a confidence score corresponding to the combination of the first-language acoustic model and the second-language lexicon model. For example, the confidence score can be that associated with a particular speech segment or word determined on the basis of a particular combination of first-language acoustic model and second-language lexicon model. The method also illustratively includes the optional step 350 of determining whether other first-language acoustic models are available. If so the additional first-language acoustic models selected, corresponding first-language phoneme sequences are generated for each additional second-language lexicon model, additional, distinct speech segments are determined for each combination, and corresponding confidence scores are determined. If there is only one second-language lexicon model available, the second-language speech segment can be determined to be that one of the distinct speech segments that has the highest confidence score.

Illustratively, the method further includes the step 360 of determining whether additional second-language lexicon models are available. Is so, each of the plurality of first language acoustic models can be combined with each of the additional second-language models for determining distinct speech segments, for each of which a distinct corresponding confidence score can be determined in step 370 as already described. Accordingly, if n first-language acoustic models are available to be combined with m second-language lexicon models, then n×m confidence scores can be compared. According to this embodiment of the method, the second-language speech segment is determined to be that one of the plurality of distinct speech segments resulting from the various combination and having the highest confidence score.

Like the various embodiments of a system according to the present invention, the various embodiments of the method aspects of the present invention can be realized in hardware, software, or a combination of both. Moreover, these and other embodiments of the present invention also can be realized in a centralized fashion in one computer system, or in a distributed fashion whereby different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

I claim:

1. A method for speech recognition of input speech in a language from a non-native speaker, the method comprising acts of:
    generating one or more feature vectors based upon one or more voice-induced electrical signals that result from the input speech;
    generating a first-language phoneme sequence from the one or more feature vectors based upon a first-language acoustic model, wherein the first-language acoustic model corresponds to a first language;
    determining a second-language speech segment from the first-language phoneme sequence based upon a second-language lexicon model, wherein the second-language lexicon model corresponds to a second language that is different from the first language;
    determining a confidence score associated with a combination of the first-language acoustic model and the second-language lexicon model; and
    selecting the first-language acoustic model from a plurality of acoustic models based at least in part on the determined confidence score, each of the plurality of acoustic models corresponding to a different respective language.

2. The method of claim 1, wherein the act of selecting the first-language acoustic model from the plurality of acoustic models comprises selecting the first-language acoustic model based at least in part of the determined confidence score being greater than another confidence score associated with a combination of another first-language acoustic model and the second-language lexicon model.

3. The method of claim 1, wherein the confidence score is associated with the second-language speech segment.

4. The method of claim 3, wherein the confidence score is based on a probability assessment that the first-language phoneme sequence generated based upon the first-language acoustic model corresponds to the second-language speech segment determined using the second-language lexicon model.

5. The method of claim 1, further comprising an act of:
    generating a speech recognition output for subsequent input speech from the non-native speaker using the first-language acoustic model.

6. The method of claim 1, wherein the first-language acoustic model is associated with a native language of the non-native speaker and the second-language lexicon model is associated with a spoken language of the input speech.

7. At least one computer-readable medium encoded with instructions that, when executed by at least one computer system, perform a method for speech recognition of input speech in a language from a non-native speaker, the method comprising acts of:
    generating, based upon a first-language acoustic model, a first-language phoneme sequence from one or more feature vectors, the one or more feature vectors being based upon one or more voice-induced electrical signals that result from the input speech, wherein the first-language acoustic model corresponds to a first language;
    determining a second-language speech segment from the first-language phoneme sequence based upon a second-language lexicon model, wherein the second-language lexicon model corresponds to a second language that is different from the first language;
    determining a confidence score associated with a combination of the first-language acoustic model and the second-language lexicon model; and
    selecting the first-language acoustic model from a plurality of acoustic models based at least in part on the determined confidence score, each of the plurality of acoustic models corresponding to a different respective language.

8. The at least one computer-readable medium of claim 7, wherein the act of selecting the first-language acoustic model from the plurality of acoustic models comprises selecting the first-language acoustic model based at least in part of the determined confidence score being greater than another confidence score associated with a combination of another first-language acoustic model and the second-language lexicon model.

9. The at least one computer-readable medium of claim 7, wherein the confidence score is associated with the second-language speech segment.

10. The at least one computer-readable medium of claim 8, wherein the confidence score is based on a probability assessment that the first-language phoneme sequence generated based upon the first-language acoustic model corresponds to the second-language speech segment determined using the second-language lexicon model.

11. The at least one computer-readable medium of claim 7, wherein the method further comprises an act of:
generating a speech recognition output for subsequent input speech from the non-native speaker using the first-language acoustic model.

12. The at least one computer-readable medium of claim 7, wherein the first-language acoustic model is associated with a native language of the non-native speaker and the second-language lexicon model is associated with a spoken language of the input speech.

13. An apparatus for speech recognition of input speech in a language from a non-native speaker, the apparatus comprising:
at least one computer-readable medium encoded with instructions; and
at least one processing unit coupled to the at least one computer-readable medium, wherein upon execution of the instructions by the at least one processing unit, the at least one processing unit:
generates one or more feature vectors based upon one or more voice-induced electrical signals that result from the input speech;
generates a first-language phoneme sequence from the one or more feature vectors based upon a first-language acoustic model, wherein the first-language acoustic model corresponds to a first language;
determines a second-language speech segment from the first-language phoneme sequence based upon a second-language lexicon model, wherein the second-language lexicon model corresponds to a second language that is different from the first language;
determines a confidence score associated with a combination of the first-language acoustic model and the second-language lexicon model; and
selects the first-language acoustic model from a plurality of acoustic models based at least in part on the determined confidence score, each of the plurality of acoustic models corresponding to a different respective language.

14. The apparatus of claim 13, wherein the at least one processing unit:
selects the first-language acoustic model based at least in part of the determined confidence score being greater than another confidence score associated with a combination of another first-language acoustic model and the second-language lexicon model.

15. The apparatus of claim 13, wherein the confidence score is associated with the second-language speech segment.

16. The apparatus of claim 15, wherein the confidence score is based on a probability assessment that the first-language phoneme sequence generated based upon the first-language acoustic model corresponds to the second-language speech segment determined using the second-language lexicon model.

17. The apparatus of claim 13, wherein the at least one processing unit:
generates a speech recognition output for subsequent input speech from the non-native speaker using the first-language acoustic model.

18. The apparatus of claim 13, wherein the first-language acoustic model is associated with a native language of the non-native speaker and the second-language lexicon model is associated with a spoken language of the input speech.

* * * * *

UNITED STATES PATENT AND TRADEMARK OFFICE
CERTIFICATE OF CORRECTION

PATENT NO. : 7,640,159 B2  Page 1 of 1
APPLICATION NO. : 10/896426
DATED : December 29, 2009
INVENTOR(S) : David E. Reich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Ninth Day of November, 2010

David J. Kappos
*Director of the United States Patent and Trademark Office*